United States Patent
Johnsrud et al.

(10) Patent No.: US 10,387,878 B2
(45) Date of Patent: Aug. 20, 2019

(54) SYSTEM FOR TRACKING TRANSFER OF RESOURCES IN A PROCESS DATA NETWORK

(71) Applicant: BANK OF AMERICA CORPORATION, Charlotte, NC (US)

(72) Inventors: Darrell Johnsrud, Camas, WA (US); Manu Jacob Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 561 days.

(21) Appl. No.: 15/050,316

(22) Filed: Feb. 22, 2016

(65) Prior Publication Data
US 2017/0243214 A1    Aug. 24, 2017

(51) Int. Cl.
G06Q 40/00    (2012.01)
G06Q 20/40    (2012.01)
G06Q 40/02    (2012.01)

(52) U.S. Cl.
CPC ......... *G06Q 20/401* (2013.01); *G06Q 40/025* (2013.01)

(58) Field of Classification Search
CPC .................................................... G06Q 40/00
USPC .......................................................... 705/38
See application file for complete search history.

(56) References Cited

U.S. PATENT DOCUMENTS

| | | |
|---|---|---|
| 5,671,283 A | 9/1997 | Michener et al. |
| 5,835,599 A | 11/1998 | Buer |
| 6,073,234 A | 6/2000 | Kigo et al. |
| 6,324,286 B1 | 11/2001 | Lai et al. |
| 6,725,303 B1 | 4/2004 | Hoguta et al. |
| 6,850,252 B1 | 2/2005 | Hoffberg |

(Continued)

FOREIGN PATENT DOCUMENTS

WO    2014162296 A1    10/2014
WO    2015135018 A1    9/2015

OTHER PUBLICATIONS

Ayodeji Odusote, Money Journey—a Transient Stop at Block Chain 2.0 , Africa News Service. Retrieved from https://dialog.proquest.com/professional/docview/1705617247?accountid=142257 (Year: 2015).*

(Continued)

*Primary Examiner* — Ojo O Oyebisi
(74) *Attorney, Agent, or Firm* — Michael A. Springs; Moore & Van Allen PLLC; Anup Shrinivasan Iyer

(57) ABSTRACT

Systems, computer program products, and methods are described herein for a system for using the block chain distributed network for managing transaction history of unbanked and underbanked users in a process data network. The present invention is configured to electronically receive an indication from a computing system associated with a first user that the first user has executed a transfer of resources with a second user; retrieve information associated with the transfer of resources from the first user; retrieve information associated with a block chain of user information associated with the first user; transmit a notification to a computing system associated with the second user to validate the transfer of resources; receive an input from the second user validating the transfer of resources; and update the block chain of user information with the validated transfer of resources based on at least receiving the input from the second user.

14 Claims, 7 Drawing Sheets

(56) References Cited

U.S. PATENT DOCUMENTS

| | | | |
|---|---|---|---|
| 6,973,187 B2 | 12/2005 | Gligor et al. |
| 7,055,039 B2 | 5/2006 | Chavanne et al. |
| 7,092,400 B2 | 8/2006 | Malzahn |
| 7,184,549 B2 | 2/2007 | Sorimachi et al. |
| 7,362,859 B1 | 4/2008 | Robertson et al. |
| 7,392,384 B2 | 6/2008 | Hopkins et al. |
| 7,428,306 B2 | 9/2008 | Celikkan et al. |
| 7,502,933 B2 | 3/2009 | Jakobsson et al. |
| 7,574,401 B1 | 8/2009 | Burns |
| 7,649,992 B2 | 1/2010 | Raju et al. |
| 7,764,788 B2 | 7/2010 | Tardo |
| 7,979,889 B2 | 7/2011 | Gladstone et al. |
| 8,078,874 B2 | 12/2011 | You et al. |
| 8,107,621 B2 | 1/2012 | Celikkan et al. |
| 8,155,311 B2 | 4/2012 | Shin et al. |
| 8,259,934 B2 | 9/2012 | Karroumi et al. |
| 8,358,781 B2 | 1/2013 | Schneider |
| 8,397,841 B1 | 2/2013 | Taylor et al. |
| 8,396,209 B2 | 3/2013 | Schneider |
| 8,416,947 B2 | 4/2013 | Schneider |
| 8,458,461 B2 | 6/2013 | Tardo |
| 8,464,320 B2 | 6/2013 | Archer et al. |
| 8,516,266 B2 | 8/2013 | Hoffberg et al. |
| 8,590,055 B2 | 11/2013 | Yoon et al. |
| 8,737,606 B2 | 5/2014 | Taylor et al. |
| 8,942,374 B2 | 1/2015 | Fujisaki |
| 8,983,063 B1 | 3/2015 | Taylor et al. |
| 9,059,866 B2 | 6/2015 | Bar-Sade et al. |
| 9,083,702 B2 | 7/2015 | Wied et al. |
| 9,092,766 B1 | 7/2015 | Bedier et al. |
| 9,298,806 B1 | 3/2016 | Vessenes et al. |
| 9,635,000 B1 | 4/2017 | Muftic |
| 9,672,499 B2 | 6/2017 | Yang et al. |
| 2003/0126094 A1 | 7/2003 | Fisher et al. |
| 2004/0172535 A1 | 9/2004 | Jakobsson et al. |
| 2004/0199463 A1 | 10/2004 | Deggendorf |
| 2005/0256802 A1 | 11/2005 | Ammermann et al. |
| 2009/0281948 A1 | 11/2009 | Carlson |
| 2010/0279653 A1 | 11/2010 | Poltorak |
| 2011/0078073 A1 | 3/2011 | Annappindi |
| 2011/0197064 A1 | 8/2011 | Garcia Morchon et al. |
| 2012/0066121 A1 | 3/2012 | Shahbazi et al. |
| 2012/0284175 A1 | 11/2012 | Wilson et al. |
| 2013/0198061 A1 | 8/2013 | Dheer et al. |
| 2013/0232056 A1 | 9/2013 | Schulman |
| 2014/0006185 A1 | 1/2014 | Zurn et al. |
| 2014/0089243 A1 | 3/2014 | Oppenheimer |
| 2014/0310171 A1 | 10/2014 | Grossman et al. |
| 2015/0172053 A1 | 6/2015 | Schwarz et al. |
| 2015/0206106 A1 | 7/2015 | Yago |
| 2015/0262137 A1 | 9/2015 | Armstrong |
| 2015/0332283 A1 | 11/2015 | Witchey |
| 2015/0379510 A1 | 12/2015 | Smith |
| 2015/0379636 A1 | 12/2015 | Szabo et al. |
| 2016/0012424 A1 | 1/2016 | Simon et al. |
| 2016/0028552 A1 | 1/2016 | Spanos et al. |
| 2016/0050203 A1 | 2/2016 | Hefetz |
| 2016/0092874 A1 | 3/2016 | O'Regan et al. |
| 2016/0125376 A1 | 5/2016 | Beatty et al. |
| 2016/0191243 A1 | 6/2016 | Manning |
| 2016/0260171 A1* | 9/2016 | Ford ..................... G06Q 40/04 |
| 2016/0275461 A1 | 9/2016 | Sprague et al. |
| 2016/0292672 A1 | 10/2016 | Fay et al. |
| 2016/0321654 A1 | 11/2016 | Lesavich et al. |
| 2016/0323109 A1 | 11/2016 | McCoy et al. |
| 2016/0342978 A1 | 11/2016 | Davis et al. |
| 2016/0342989 A1 | 11/2016 | Davis |
| 2016/0342994 A1 | 11/2016 | Davis |
| 2017/0005804 A1 | 1/2017 | Zinder |
| 2017/0011460 A1 | 1/2017 | Molinari et al. |
| 2017/0046526 A1 | 2/2017 | Chan et al. |
| 2017/0046664 A1 | 2/2017 | Haldenby et al. |
| 2017/0046680 A1 | 2/2017 | Crites |
| 2017/0046806 A1* | 2/2017 | Haldenby ........... G06Q 20/0655 |
| 2017/0048216 A1 | 2/2017 | Chow et al. |
| 2017/0091397 A1 | 3/2017 | Shah |
| 2017/0103167 A1 | 4/2017 | Shah |
| 2017/0103461 A1 | 4/2017 | Acuña-Rohter et al. |
| 2017/0109735 A1 | 4/2017 | Sheng et al. |
| 2017/0116693 A1 | 4/2017 | Rae et al. |
| 2017/0132625 A1 | 5/2017 | Kennedy |
| 2017/0132626 A1 | 5/2017 | Kennedy |
| 2017/0132630 A1 | 5/2017 | Castinado et al. |
| 2017/0140375 A1 | 5/2017 | Kunstel |
| 2017/0163733 A1 | 6/2017 | Grefen et al. |
| 2017/0177855 A1 | 6/2017 | Costa Faidella et al. |
| 2017/0178131 A1 | 6/2017 | Fernandez et al. |
| 2017/0178237 A1 | 6/2017 | Wong |
| 2017/0180134 A1 | 6/2017 | King |
| 2017/0200137 A1 | 7/2017 | Vilmont |
| 2017/0213209 A1 | 7/2017 | Dillenberger |
| 2017/0214675 A1 | 7/2017 | Johnsrud et al. |
| 2017/0214698 A1 | 7/2017 | Hughes et al. |
| 2017/0220998 A1 | 8/2017 | Horn et al. |
| 2017/0221052 A1 | 8/2017 | Sheng et al. |
| 2017/0223005 A1 | 8/2017 | Birgisson et al. |
| 2017/0228447 A1 | 8/2017 | Catania et al. |
| 2017/0228822 A1 | 8/2017 | Creighton, IV et al. |
| 2017/0230378 A1 | 8/2017 | Bliss |
| 2017/0232300 A1 | 8/2017 | Tran et al. |
| 2017/0235955 A1 | 8/2017 | Barkan |
| 2017/0236407 A1 | 8/2017 | Rhoads et al. |
| 2017/0243020 A1 | 8/2017 | Dhondse et al. |
| 2018/0053161 A1 | 2/2018 | Bordash et al. |
| 2018/0268479 A1 | 9/2018 | Dowling et al. |

OTHER PUBLICATIONS

Bradley Hope et al., "A Bitcoin Technology Gets Nasdaq Test"; May 10, 2015; retrieved from http://www.wsj.com/articles/a-bitcoin-technology-gets-nasdaq-test-1431296886.

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

Buterin, Vitalik, "On Public and Private Blockchains", Aug. 7, 2015, https://blog.ethereum.org/2015/08/07/on-public-and-private-blockchains/.

Malahov, Yanislav Georgiev, "BitAlias 1, Aka Usernames for Bitcoin, A New, Simple Naming System for Bitcoin Addresses", retrieved from https://medium.com/bitalias-decentralized-naming-and-identity-service/bitalias-7b66bffed9d8 on Mar. 12, 2017; Bringing Crypto to the People, Founder of www.aeternity.com, Jun. 6, 2015.

International Search Report for International Application No. PCT/IB16/01655 dated Mar. 11, 2017.

Written Opinion for International Application No. PCT/IB16/01655 dated Mar. 12, 2017.

Tasca. "Digital currencies: Principles, trends, opportunities, and risks." In: Trends, Opportunities, and Risks. Sep. 7, 2015 (Sep. 7, 2015) Retrieved from <https://www.researchgate.net/profile/Paolo_Tasca/publication/290805276 Digital Currencies Principles Trends Opportunities and Risks/links/569bb91e08ae6169e5624552.pif> p. 5, 10, 12, 14.

Lerner. "MAVEPAY a new lightweight payment scheme for peer to peer currency networks." Apr. 17, 2012 (Apr. 17, 2012) Retrieved from <https://pdfs.semanticscholar.org/1185/a26f014678b959876519065c2624458d75b8.pdf>, entire document.

(56) References Cited

OTHER PUBLICATIONS

International Search Report and Written Opinion for PCT/US2016/061402 dated Dec. 27, 2016.

* cited by examiner

SYSTEM FOR TRACKING TRANSFER OF RESOURCES IN A PROCESS DATA NETWORK

BACKGROUND

Tracking transfer of resources between two parties typically requires each party to track and maintain data associated with the transfer of resources independently of each other. In some cases, the validating the transfer of resources that are otherwise untrackable has posed a significant problem. As such, a need currently exists for an improved system for tracking transfer of resources in a process data network.

BRIEF SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system operatively connected with a block chain distributed network and for using the block chain distributed network for managing transaction history of unbanked and underbanked users in a process data network is presented. The system comprising: a memory device storing logic and rules for the block chain; and a processing device operatively coupled to the memory device, wherein the processing device is configured to execute computer-readable program code to: electronically receive an indication from a computing system associated with a first user that the first user has executed a transfer of resources with a second user; retrieve information associated with the first user, information associated with the second user, and information associated with the transfer of resources from the first user; retrieve information associated with a block chain of user information associated with the first user; transmit a notification to a computing system associated with the second user to validate the transfer of resources, wherein the notification comprises a link to a web portal associated with a block chain of user information associated with the first user, information associated with the first user, information associated with the second user, and information associated with the transfer of resources from the first user; receive, via the web portal, an input from the second user validating the transfer of resources; and update the block chain of user information associated with the first user with the validated transfer of resources based on at least receiving the input from the second user.

In some embodiments, the processing device is configured to execute computer-readable program code further to: receive an indication that the first user wishes to execute a transaction with a financial institution; determine that the first user execution of the transaction requires determining a creditworthiness of the first user; retrieve information associated with the transfer of resources executed by the first user from the block chain of user information indicating one or more transfer of resources executed by the first user without the financial institution or any other financial institutions; and determine a credit worthiness of the user based on at least the information retrieved from the block chain of user information.

In some embodiments, the processing device is configured to execute computer-readable program code further to: determine that the creditworthiness of the first user is greater than a predetermined threshold; and allow the execution of the transaction with the financial institution based on based on at least determining that the creditworthiness of the first user is greater than the predetermined threshold.

In some embodiments, the processing device is configured to execute computer-readable program code further to: receive a request from one or more entities to access the block chain to update the block chain with information associated with one or more transfer of resources executed by the first user with the one or more entities; determine that the one or more entities is a member, wherein a member has authorized access to the block chain; enable the one or more entities to access the block chain; receive information associated with the transfer of resources executed by the first user with the one or more entities; and update the block chain with the information received from the one or more entities.

In some embodiments, the processing device is configured to execute computer-readable program code further to: receive one or more authentication credentials from the one or more entities to enable the one or more entities to access the block chain; validate the one or more authentication credentials; and enable the one or more entities to access the block chain in response to validating the one or more authentication credentials.

In some embodiments, the processing device is configured to execute computer-readable program code further to: determine that the first user has executed the transfer of resources with the second user using a financial institution account associated with the first user; retrieve information associated with the financial institution account associated with the first user; and transmit the information associated with the financial institution account associated with the first user to the computing system associated with the second user for validation of the transfer of resources, wherein the information associated with the financial institution account associated with the first user is transmitted with the notification.

In some embodiments, the processing device is configured to execute computer-readable program code further to: update the block chain of user information with the transfer of resources executed by the first user with the one or more entities; transmit a request to the one or more members to validate the transfer of resources based on the logic and rules for the block chain; and post validated transaction activity to distributed memory of the block chain of user information associated with the first user.

In another aspect, a computerized method for using the block chain distributed network for managing transaction history of unbanked and underbanked users in a process data network is presented. The method comprising: electronically receiving an indication from a computing system associated with a first user that the first user has executed a transfer of resources with a second user; retrieving information associated with the first user, information associated with the second user, and information associated with the transfer of resources from the first user; retrieving information associated with a block chain of user information associated with the first user; transmitting a notification to a computing system associated with the second user to validate the transfer of resources, wherein the notification comprises a link to a web portal associated with a block chain of user information associated with the first user, information associated with the first user, information associated with the second user, and information associated with the transfer of resources from the first user; receiving, via the web portal, an input from the second user validating the transfer of resources; and updating the block chain of user information associated with the first user with the validated transfer of resources based on at least receiving the input from the second user.

In yet another aspect, an computer program product for execution on a system operatively connected with the block chain distributed network, the computer program product for using the block chain distributed network for managing transaction history of unbanked and underbanked users in a process data network is presented. The computer program product comprising at least one non-transitory computer-readable medium having computer-readable program code portions embodied therein, the computer-readable program code portions comprising, the system comprising: an executable portion configured to electronically receive an indication from a computing system associated with a first user that the first user has executed a transfer of resources with a second user; an executable portion configured to retrieve information associated with the first user, information associated with the second user, and information associated with the transfer of resources from the first user; an executable portion configured to retrieve information associated with a block chain of user information associated with the first user; an executable portion configured to transmit a notification to a computing system associated with the second user to validate the transfer of resources, wherein the notification comprises a link to a web portal associated with a block chain of user information associated with the first user, information associated with the first user, information associated with the second user, and information associated with the transfer of resources from the first user; an executable portion configured to receive, via the web portal, an input from the second user validating the transfer of resources; and an executable portion configured to update the block chain of user information associated with the first user with the validated transfer of resources based on at least receiving the input from the second user.

BRIEF DESCRIPTION OF THE DRAWINGS

Figure 1:
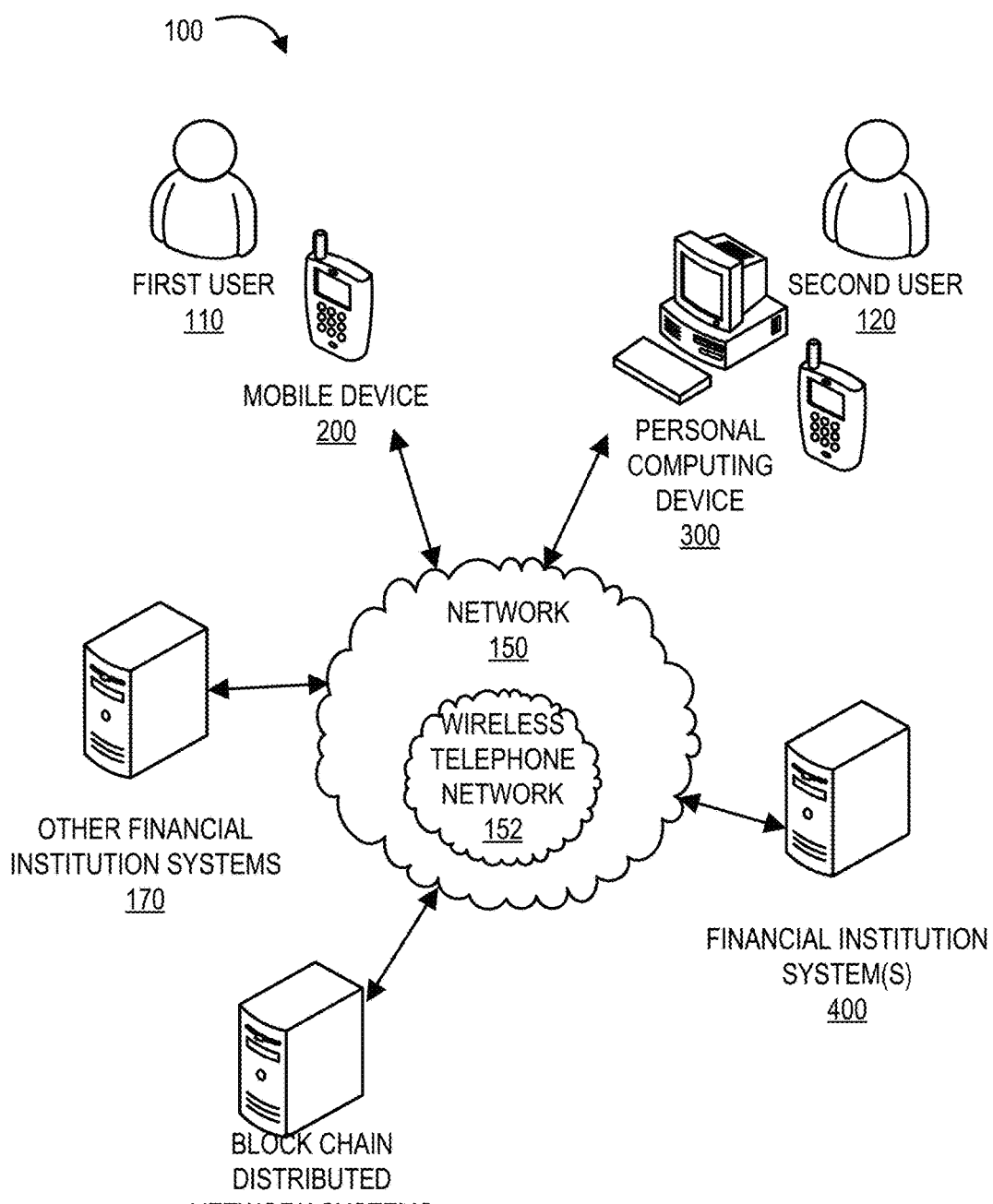
Figure 2:
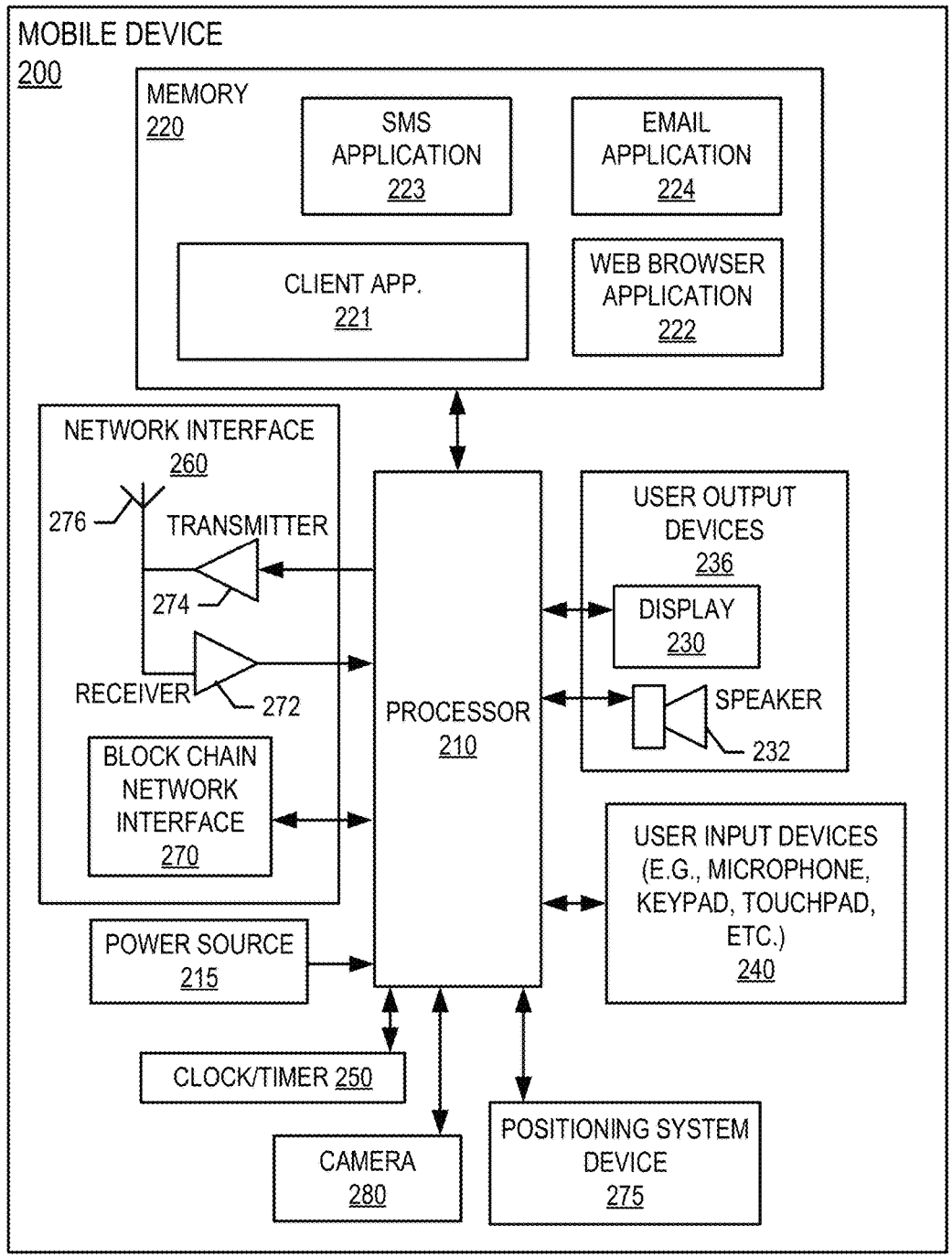
Figure 3:
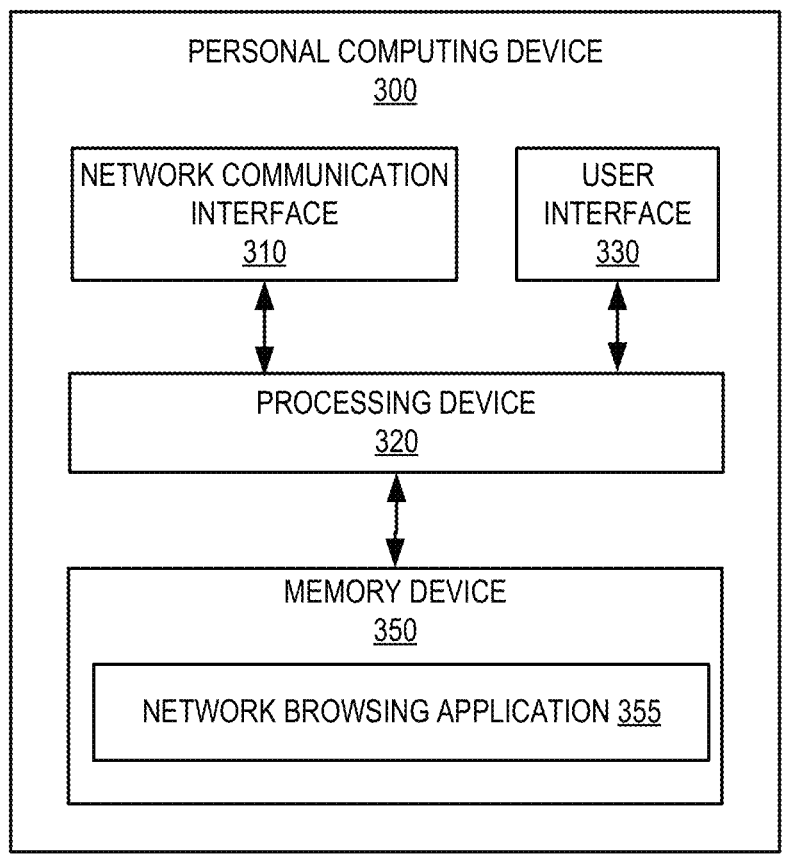
Figure 4:
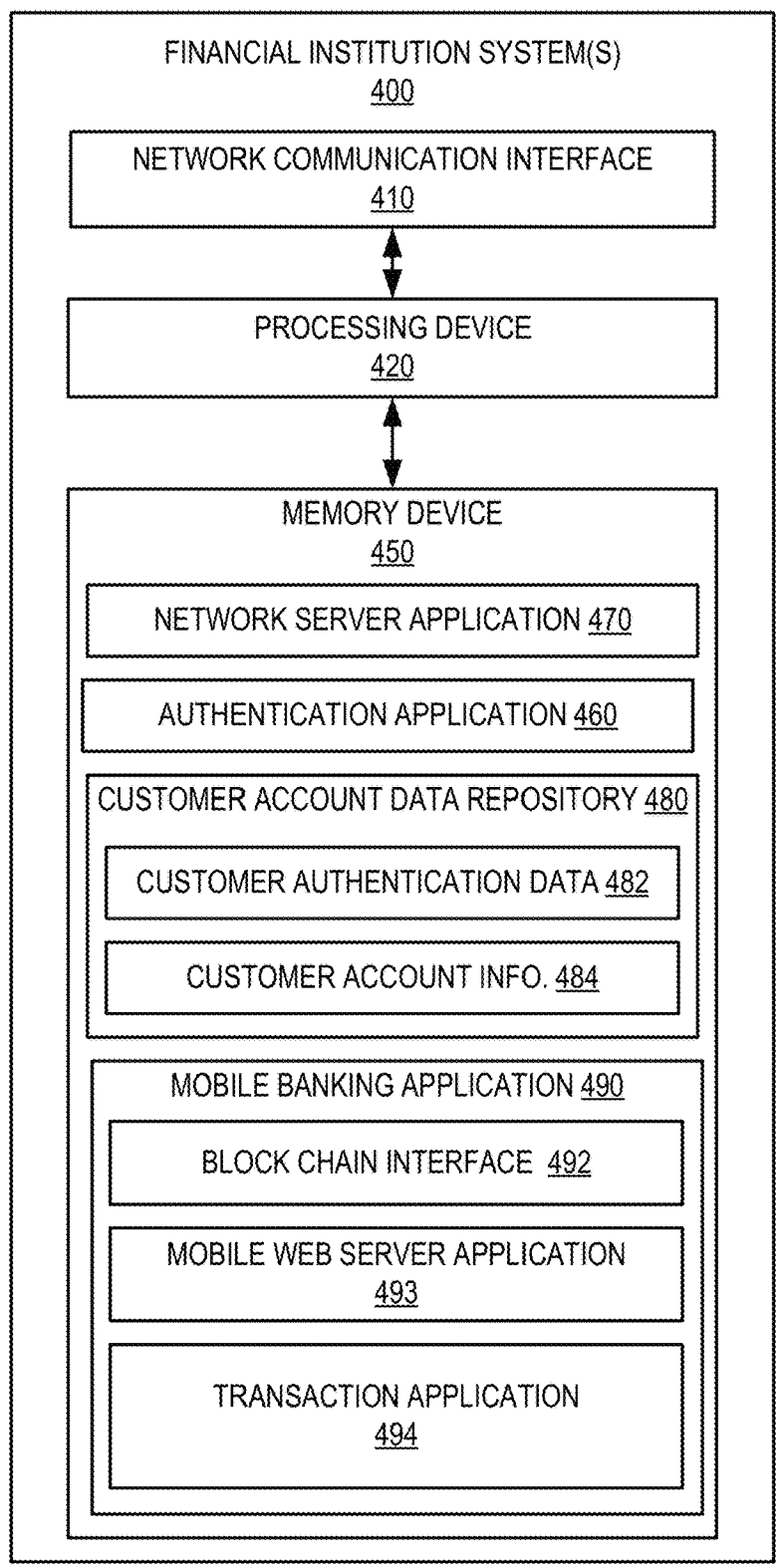
Figure 5:
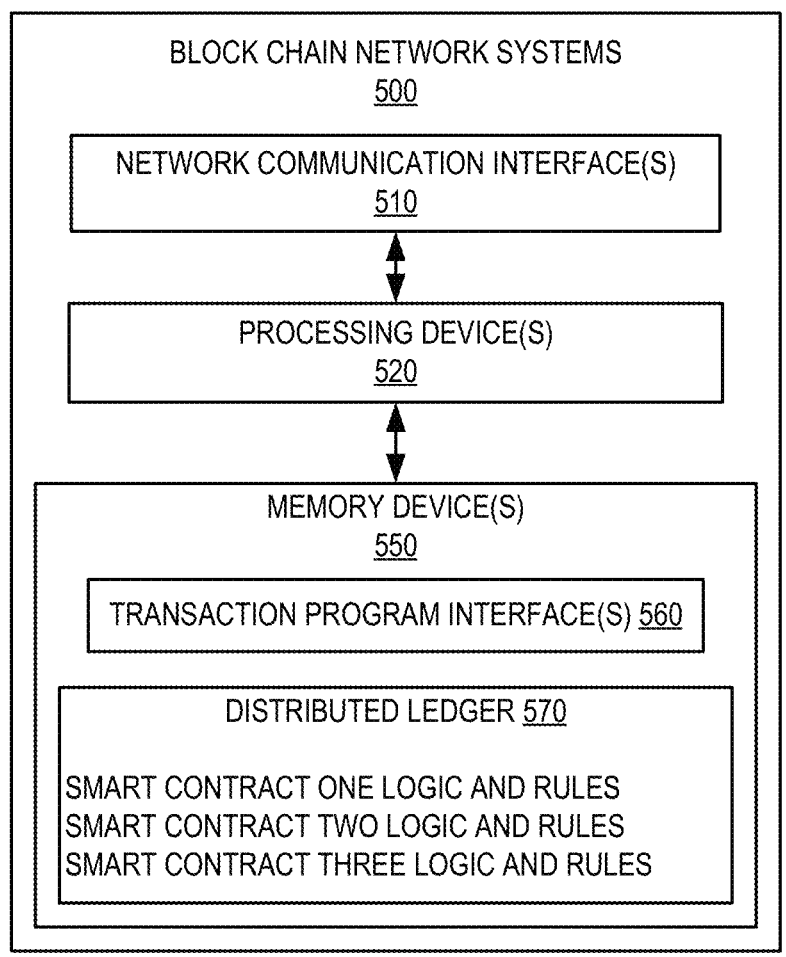
Figure 6A:
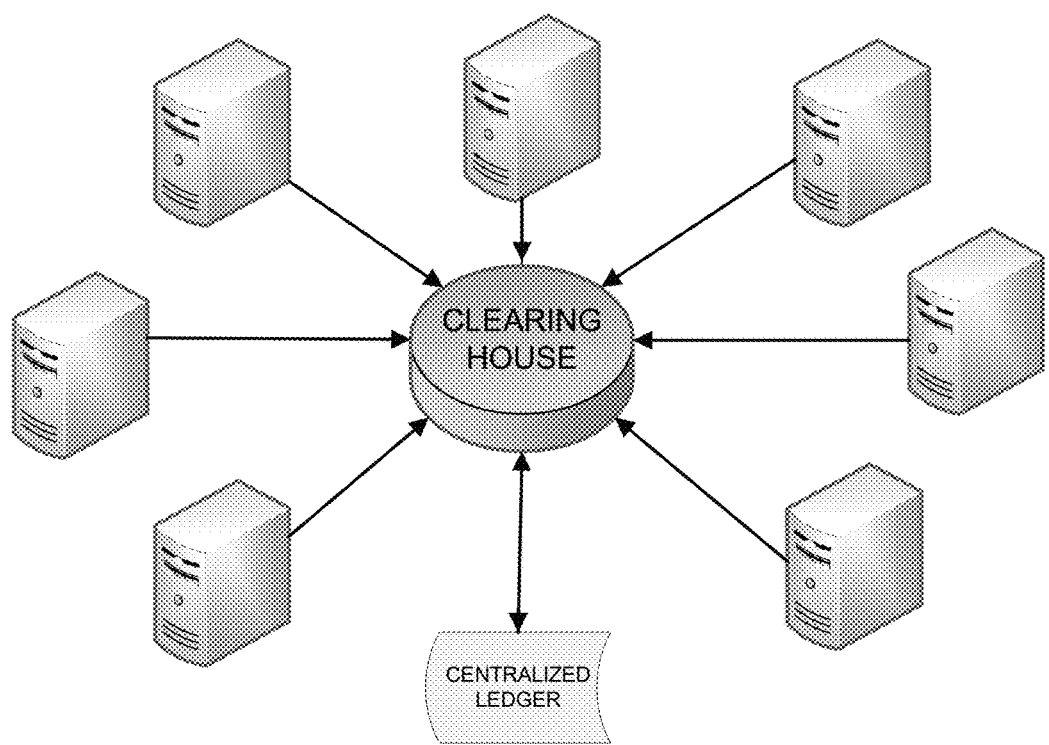
Figure 6B:
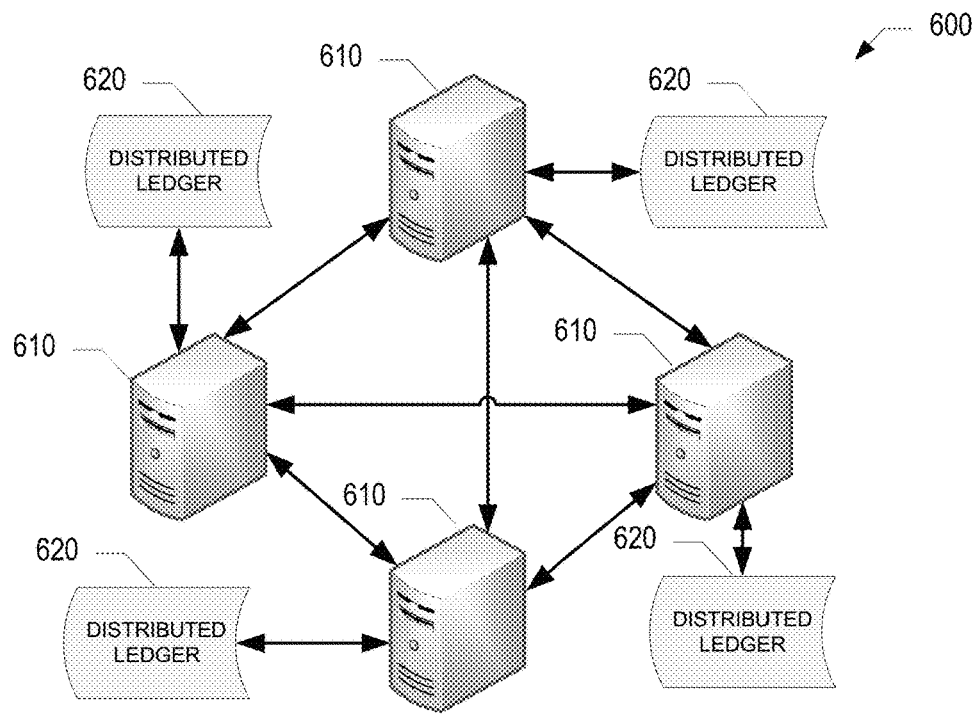
Figure 7:
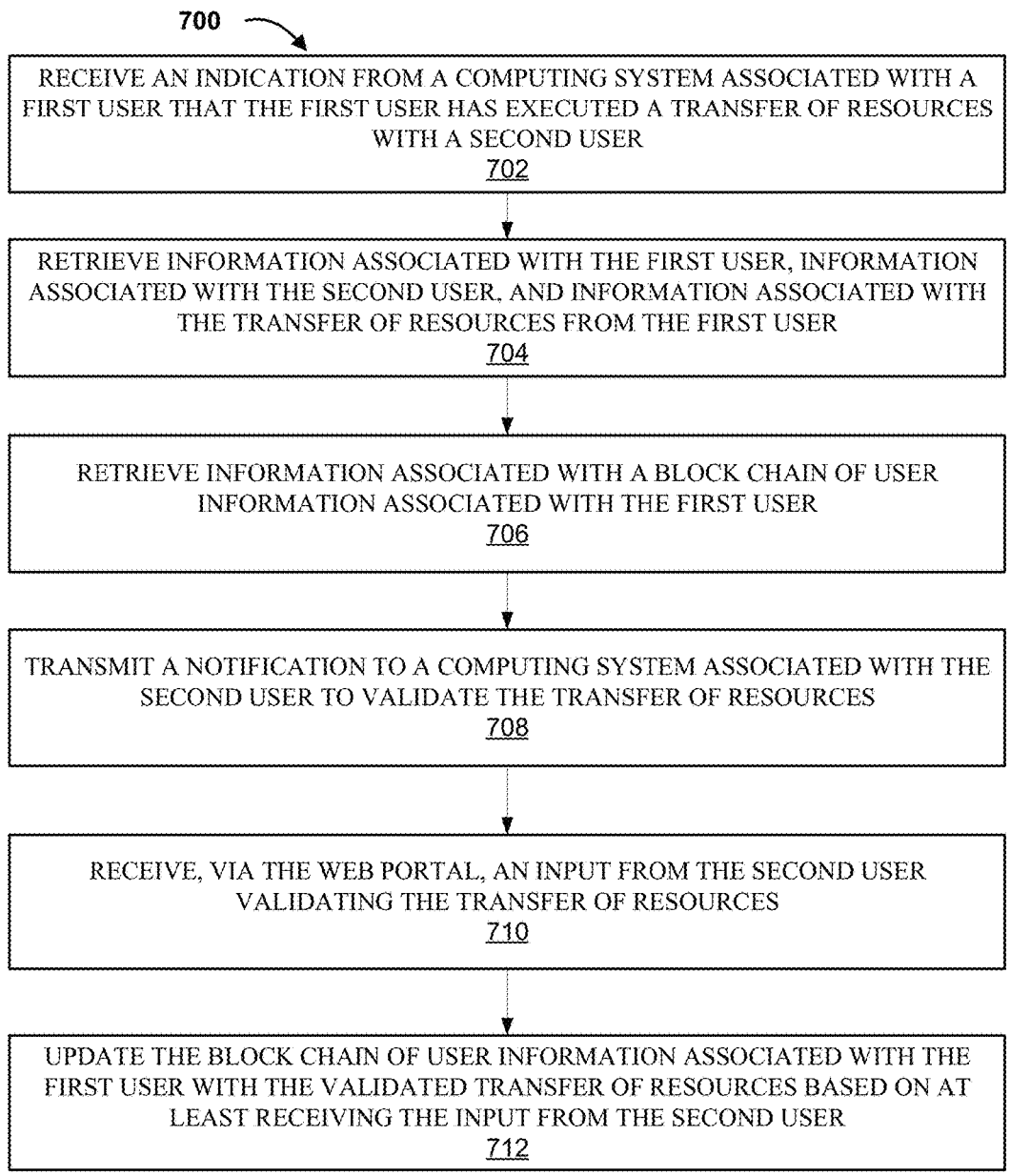

Having thus described embodiments of the invention in general terms, reference will now be made to the accompanying drawings, where:

FIG. 1 provides a block diagram illustrating a smart contract block chain system environment for detection and countering data tampering in a process data network, in accordance with embodiments of the invention;

FIG. 2 provides a block diagram illustrating the first user's mobile computing device of FIG. 1, in accordance with embodiments of the invention;

FIG. 3 provides a block diagram illustrating the second user's personal computing device of FIG. 1, in accordance with embodiments of the invention;

FIG. 4 provides a block diagram illustrating the financial institution system(s) of FIG. 1, in accordance with embodiments of the invention;

FIG. 5 provides a block diagram illustrating the block chain network systems of FIG. 1, in accordance with embodiments of the invention;

FIG. 6A is a diagram illustrating a centralized clearing-house network configuration, in accordance with embodiments of the invention;

FIG. 6B is a diagram illustrating a decentralized block chain network configuration, in accordance with embodiments of the invention; and FIG. 7 illustrates a process flow for managing transaction history of unbanked users in the process data network, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

FIG. 1 provides a block diagram illustrating a smart contract block chain system and environment for control of device identity and usage in a process data network 100, in accordance with an embodiment of the invention. As illustrated in FIG. 1, the environment 100 includes a first user 110 and/or a second user 120 where the users represent customers of one or more financial institution(s). A user of the system may be a person, but may also be a business (e.g., a merchant) or any other entity. For purposes of the invention, the term "user", and "customer" may be used interchangeably.

The environment 100 also may include a mobile device 200 and a personal computing device 300 for use by the first user 110 and second user 120, respectively. The personal computing device 300 may be any device that employs a processor and memory and can perform computing functions, such as a personal computer or a mobile device. As used herein, a "mobile device" 200 is any mobile communication device, such as a cellular telecommunications device (i.e., a cell phone or mobile phone), personal digital assistant (PDA), a mobile Internet accessing device, or other mobile device.

The mobile device 200 and the personal computing device 300 are configured to communicate over a network 150 with a financial institution system(s) 400 and, in some cases, one or more other financial institution systems 170 and with the blockchain, as represented by the block chain distributed network systems 500. The first user's mobile device 200, the second user's personal computing device 300, the financial institution system(s) 400, the block chain distributed network systems 500, and any other participating financial institution systems 170 are each described in greater detail below with reference to FIGS. 2-5. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, a mobile device 200 is configured to connect with the network 150 to log the first user 110 into a block chain interface 492 of the financial institution system(s) 400 and/or the block chain distributed network systems 500 (i.e., "block chain systems 500). A user, in order to access the first user's account(s), online banking application and/or mobile banking application on the financial institution system(s) 400 must authenticate with the financial institution system(s) 400 and/or another system. Similarly, in some embodiments, in order to access the distributed ledger(s) of the block chain systems 500, a user must authenticate with the financial institution system(s) 400 and/or another system, such as one of the block chain systems 500. For example, logging into the financial institution system(s) 400 generally requires that the first user 110 authenticate his/her identity using a user name, a passcode, a cookie, a biometric identifier, a private key, a token, and/or another authentication mechanism that is provided by the first user 110 to the financial institution system(s) 400 via the mobile device 200.

The financial institution system(s) 400 are in network communication with other devices, such as other financial institutions' transaction/banking systems 170, block chain systems 500, and a personal computing device 300 that is configured to communicate with the network 150 to log a second user 120 into the financial institution system(s) 400. In one embodiment, the invention may provide an application download server such that software applications that support the financial institution system(s) 400 can be downloaded to the mobile device 200.

In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system(s) 400.

In some embodiments of the invention, the block chain systems 500 are configured to be controlled and managed by one or more third-party data providers (not shown), financial institutions or other entities over the network 150. In other embodiments, the block chain systems 500 are configured to be controlled and managed over the network 150 by the same entity that maintains the financial institution system(s) 400.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone is merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, a network interface 260, a power source 215, a clock or other timer 250, a camera 280, and a positioning system device 275. The processor 210, and other processors described herein, generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a block chain network interface 270. The block chain network interface 270 may include software, such as encryption software, and hardware, such as a modem, for communicating information to and/or from one or more devices on a network 150 and connected with or that are part of the block chain systems 500. For example, the mobile device may 200 wirelessly communicate encrypted activity information to a terminal of the network 150 or the block chain systems 500.

As described above, the mobile device 200 has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to receive data from a user such as the first user 110, may include any of a number of devices allowing the mobile device 200 to receive data from a user, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a merchant or other location to determine that the mobile device 200 is located proximate these known devices. Such information may be used by embodiments of the invention in order to demonstrate completion or partial completion of one or more activities associated with a smart contract.

The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices.

The mobile device 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EE-PROM), flash memory or the like.

The memory 220 can store any of a number of applications which comprise computer-executable instructions/code executed by the processor 210 to implement the functions of the mobile device 200 and/or one or more of the process/method steps described herein. For example, the memory 220 may include such applications as a conventional web browser application 222 and/or a client application 221. These applications also typically provide a graphical user interface (GUI) on the display 230 that allows the first user 110 to communicate with the mobile device 200, the financial institution system(s) 400, and/or other devices or systems. In one embodiment of the invention, when the first user 110 decides to enroll in the transaction program, the first user 110 downloads or otherwise obtains the client application 221 from the financial institution system(s) 400, from the block chain systems 500 or from a distinct application server. In other embodiments of the invention, the first user 110 interacts with the financial institution system(s) 400 or the block chain systems 500 via the web browser application 222 in addition to, or instead of, the client application 221.

The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information, etc.

Referring now to FIG. 3, the personal computing device 300 associated with the second user 120 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a financial institution system (s) 400 and/or the block chain systems 500 (shown in FIG. 1) for the purpose of initiating enrollment in the transaction program, interacting with a device transaction interface, inputting data indicative of actions associated with one or more smart contracts and/or managing transactions, in accordance with embodiments of the invention.

As used herein, "smart contracts" are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators. In some embodiments, the nodes in the block chain may be entity such as financial institutions that function as gateways for other entities.

As used herein, "transaction information" may include both monetary and non-monetary transaction information and records. Non-monetary transaction information or records means historical transaction information such as account balances, account activity, misappropriation activity, purchase activity, payment activity and the like and is distinguished from the underlying monetary transactions such as settling of accounts, payments, debits, credits, fund transfers and the like.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices to input data received from the first user 110 or second user 120 or output data to the first user 110 or second user 120. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 350 generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

FIG. 4 provides a block diagram illustrating the financial institution system(s) 400, in greater detail, in accordance with embodiments of the invention. As illustrated in FIG. 4, in one embodiment of the invention, the financial institution system(s) 400 include one or more processing devices 420 operatively coupled to a network communication interface 410 and a memory device 450. In certain embodiments, the financial institution system(s) 400 are operated by a first entity, such as a financial institution, while in other embodiments, the financial institution system(s) 400 are operated by an entity other than a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system(s) 400 described herein. For example, in one embodiment of the financial institution system(s) 400, the memory device 450 includes, but is not limited to, a network server application 470, an authentication application 460, a customer account data repository 480 which includes customer authentication data 480 and customer account information 484, a mobile banking application 490 which includes a block chain interface 492, a mobile web server application 493, a downloadable transaction application 494 and other computer-executable instructions or other data. The computer-executable program code of the network server application 470, the authentication application 460, or the mobile banking application 490 may instruct the processing device 420 to perform certain logic, data-processing, and data-storing functions of the financial institution system(s) 400 described herein, as well as communication functions of the financial institution system(s) 400.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482, and the block chain interface 492 when authenticating a user to the financial institution system(s) 400 and/or the block chain systems 500.

As used herein, a "communication interface" generally includes a modem, server, transceiver, and/or other device for communicating with other devices on a network, and/or a user interface for communicating with one or more customers. Referring again to FIG. 4, the network communication interface 410 is a communication interface having one or more communication devices configured to communicate with one or more other devices on the network 450, such as the mobile device 200, the personal computing device 300, the other financial institution banking systems 170, and the block chain systems 500. The processing device 420 is configured to use the network communication interface 410 to transmit and/or receive data and/or commands to and/or from the other devices connected to the network 150.

FIG. 5 provides a block diagram illustrating block chain network systems 500, in accordance with embodiments of the invention. As discussed with reference to FIG. 6B below, embodiments of the block chain may include multiple systems, servers, computers or the like maintained by one or many entities. FIG. 5 merely illustrates one of those systems that, typically, interacts with many other similar systems to form the block chain. In one embodiment of the invention, the block chain network systems 500 are operated by a second entity that is a different or separate entity from the first entity (e.g., the financial institution) that, in one embodiment of the invention, implements the financial institution system(s) 400. In some embodiments, the financial institution system(s) 400 are part of the block chain. Similarly, in some embodiments, the block chain network systems 500 are part of the financial institution system(s) 400. In other embodiments, the financial institution system(s) 400 are distinct from the block chain network systems 500.

As illustrated in FIG. 5, the one of the block chain network systems 500 generally includes, but is not limited to, a network communication interface 510, a processing device 520, and a memory device 550. The processing device 520 is operatively coupled to the network communication interface 510 and the memory device 550. In one embodiment of the block chain network systems 500, the memory device 550 stores, but is not limited to, a transaction program interface 560 and a distributed ledger 570. In some embodiments, the distributed ledger 570 stores data including, but not limited to, smart contract logic and rules, such as a first smart contract, its associated logic and rules, a second smart contract, its associated logic and rules, a third smart contract, its associated logic and rules, etc. In one embodiment of the invention, both the transaction program interface 560 and the distributed ledger 570 may associate with applications having computer-executable program code that instructs the processing device 520 to operate the network communication interface 510 to perform certain communication functions involving the distributed ledger 570 described herein. In one embodiment, the computer-executable program code of an application associated with the distributed ledger 570 may also instruct the processing device 520 to perform certain logic, data processing, and data storing functions of the application associated with the distributed ledger 570 described herein.

The network communication interface 510 is a communication interface having one or more communication devices configured to communicate with one or more other devices on the network 150. The processing device 520 is configured to use the network communication interface 510 to receive information from and/or provide information and commands to a mobile device 200, a personal computing device 300, other financial institution systems 170, other block chain network systems 500, the financial institution system(s) 400 and/or other devices via the network 150. In some embodiments, the processing device 520 also uses the network communication interface 510 to access other devices on the network 150, such as one or more web servers of one or more third-party data providers. In some embodiments, one or more of the devices described herein may be operated by a second entity so that the second entity controls the various functions involving the block chain network systems 500. For example, in one embodiment of the invention, although the financial institution system(s) 400 are operated by a first entity (e.g., a financial institution), a second entity operates one or more of the block chain network systems 500 that store various copies of the distributed ledger 570.

As described above, the processing device 520 is configured to use the network communication interface 510 to gather data, such as data corresponding to transactions, blocks or other updates to the distributed ledger 570 from various data sources such as other block chain network systems 500. The processing device 520 stores the data that it receives in its copy of the distributed ledger 570 stored in the memory device 550.

As discussed above, in some embodiments of the invention, an application server or application download server (not shown) might be provided. The application download server may include a network communication interface, a processing device, and a memory device. The network communication interface and processing device are similar to the previously described network communication interface 410 and the processing device 420 previously described. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a qualified user's mobile device or personal computing device.

Rather than utilizing a centralized database of aliases as discussed with reference to some embodiments above and as shown in FIG. 6A, other various embodiments of the invention may use a decentralized block chain configuration or architecture as shown in FIG. 6B in order to facilitate a transaction management program using smart contracts distributed on a block chain distributed network. Such a decentralized block chain configuration ensures accurate mapping of smart contracts to financial institutions and/or customers. Accordingly, a block chain configuration may be used to maintain an accurate ledger of smart contract and/or transaction records and to provide validation of transactions involving those smart contracts.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. In some embodiments, the block chain system disclosed, SS the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, that meets other criteria.

As mentioned above and referring to FIG. 6B, a block chain 600 is typically decentralized—meaning that a distributed ledger 620 (i.e., a decentralized ledger) is maintained on multiple nodes 610 of the block chain 600. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes of the system might be financial institutions that function as gateways for other financial institutions. For example, a credit union might hold the account, but access to the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications. In some embodiments, a block chain may be characterized as a public block chain, a consortium block chain, or a private block chain. In this regard, the public block chain is a block chain that anyone in the world can read, anyone in the world can send transactions to and expect to see them included if they are valid, and anyone in the world can participate in the consensus process. The consensus process is a process for determining which of the blocks get added to the chain and what the current state each block is. Typically, public block chains are secured by crypto economics—the combination of economic incentives and cryptographic verification using mechanisms such as proof of work, following a general principle that the degree to which someone can have an influence in the consensus process is proportional to the quantity of economic resources that they can bring to bear. A public block chain is generally considered to be fully decentralized.

In some embodiments, a consortium block chain is a block chain where the consensus process is controlled by a pre-selected set of nodes; for example, a block chain may be associated with a number of member institutions (say 15), each of which operate in such a way that the at least 10 members must sign every block in order for the block to be valid. The right to read such a block chain may be public, or restricted to the participants. These block chains may be considered partially decentralized.

In still other embodiments, fully private block chains is a block chain whereby permissions are kept centralized with one entity. The permissions may be public or restricted to an arbitrary extent.

In a particular implementation, the block chain configuration may allow financial institutions to exchange non-monetary transaction information (e.g. misappropriation data) with one another without a central source. The block chain can place transaction information onto a block chain "closed-loop" such that member financial institutions of the closed-loop block chain may access the transactional information of other members of the closed-loop block chain. The block chain is used to share historical transaction information such as a user's transaction record rather than to effectuate the actual monetary transaction. In some cases, the financial institution and/or third parties can validate information using a key or authentication signature.

For any given financial institution a number of users, and in a typical case a very large number of users, may complete a wide variety of transactions with that financial institution that are made of record with that financial institution to create a historical transaction record. For example, a user may be a customer of the financial institution and that customer may engage in banking transactions such as an account holder, loans, credit/debit card transactions, lines of credit or the like. The customer may be a relatively small individual client or a large institutional client. Moreover, the user of one financial institution may also be a user of multiple unrelated financial institutions such that the complete transaction record for the user is held by a number of independent financial institutions where the user can only obtain a the complete transaction record by accessing the transaction record of every financial institution with which that user has a relationship. In the system of the invention all member financial institutions may be part of the block chain such that the complete transaction record of a user of any of the member financial institutions may be made available to that user by the user accessing any one of the financial institutions.

FIG. 7 illustrates a process flow for using the block chain distributed network for managing transaction history of unbanked and underbanked users in a process data network 700, according to an embodiment of the invention. Typically, an underbanked user is an individual that has poor access to mainstream financial services normally offered by financial institutions. The unbanked are individuals without an account at a financial institution or a bank and are considered to be outside the mainstream for one reason or another. In some situations, an individual who is unbanked or underbanked may require financial services at a financial institution. The present invention provides the functional benefit of providing individuals who are unbanked or underbanked with one or more financial services based on at least user information indicating transaction history stored in a block chain distributed network.

As shown in block 702, the process flow includes electronically receiving an indication from a computing system associated with a first user that the first user has executed a transfer of resources with a second user. In some embodiments, the resources may include but is not limited to, capitals, income, possessions, properties, funds, assets, and/or the like. In one aspect, the transfer of resources may refer to a transaction conducted by the user. Exemplary transactions include, but are not limited to: purchasing, renting, selling, and/or leasing one or more goods and/or services (e.g., merchandise, groceries, tickets, and the like); withdrawing cash; making deposits; making payments to creditors (e.g., paying bills, paying taxes, and the like); sending remittances; transferring funds; loading money onto stored value cards; and/or the like.

Next, as shown in block 704, the process flow includes retrieving information associated with the first user, information associated with the second user, and information associated with the transfer of resources from the first user. In some embodiments, information associated with the first user and/or the second user may include but is not limited to information associated with a computing device of each user, a user profile, a financial status, the financial institution account information, or the like. In some other embodiments, the information associated with the transfer of resources can be any information that identifies, defines, describes, and/or is otherwise associated with the transfer of resources. For example, the transfer of resources include a transaction, then exemplary transaction information includes, but is not limited to, the party(ies) involved in the transaction, the date and/or time of the transaction, the account(s) involved in the transaction, the transaction amount(s) associated with the transaction, the good(s) and/or service(s) involved in the transaction, a description of the transaction (which, itself, can include any transaction information, e.g., the description may describe the transaction status, the goods and/or services involved in the transaction, and the like), and/or the like.

In some embodiments, the user information may also include determining whether the users are underbanked or unbanked. Typically, underbanked users are defined as those that have a checking or savings account with the financial institution but rely on alternative financial services. Specifically, underbanked users have used non-bank money orders, non-bank check-cashing services, payday loans, rent-to-own agreements, or pawnshops at least once or twice a year. In some embodiments, underbanked users use minimal financial institution services, such as, maintaining a minimal balance in the checking account associated with the financial institution. For example, an underbanked user may receive an income check from an employer or a government to be deposited in the checking account. The user may then withdraw funds from the checking account for payments towords rent, food, and utilities while leaving funds and the checking account to cover minimum balance. Although such a user has a financial institution account, the financial institution may still not have adequate information associated with the underbanked user to determine creditworthiness. In this regard, the system may be configured to receive an indication that the first user wishes to execute a transaction with the financial institution. In response, determine that the user execution of the transaction requires determining the creditworthiness of the first user. In this regard, the system may be configured to retrieve information associated with the transfer of resources executed by the first user from a block chain of user information indicating one or more transfer of resources executed by the first user without the financial institution or any other financial institutions. The system may then analyze the retrieved information to analogize the transfer of resources executed by the first user with possible financial institution transactions to determine a corresponding creditworthiness of the first user. In some embodiments, the system may determine that the creditworthiness of the first user is greater than the predetermined threshold and in response, allow the execution of the transaction with the financial institution.

Next, as shown in block 706, the process flow includes retrieving information associated with a block chain of user information associated with the first user. In some embodiments, the block chain may either be created by the user or financial institution associated with the user where the user has one or more financial institution accounts. In situations where the block chain is created by the financial institution, the financial institution that creates or has initial access to the block chain network is considered the "host institution" and the systems of the host institution may be referred to as "host systems". A "source institution" is a financial institution other than the host institution that has transaction activity records of a user and the systems of the source institution may be referred to as "source systems". Financial institutions may function as both source institutions and host institutions depending on whether the financial institution has access to the block chain. In situations where the block chain is created by the user, the user that creates or has initial access to the block chain network is considered the "host" and the systems of the host may be referred to as "host systems". A "source" is a user other than the host who has records associated with transfer of resources with the user and the systems of the source may be referred to as "source systems". Typically, each time a first user transacts with a second user or with a first financial institution, a transaction activity record is created by the second user or the first financial institution which may maintain the transaction activity record in a proprietary system accessible only to that second user or the first financial institution. Similarly, when the user transacts with a second financial institution, the second financial institution creates a transaction activity record which it may maintain in a proprietary system accessible only to the second financial institution. The user may perform transactions with any additional number of users or financial institutions and each of the additional users or additional financial institutions may create transaction activity records which may be maintained in individual proprietary systems. Instead, the financial institution according to the present invention may create a block chain distributed network with information associated with past transactions executed by the user. In addition, the user and/or financial institution may request one or more other users, entities, and/or financial institutions also associated with the user to record information associated with transactions executed by the user such that the block chain may provide a comprehensive view of the user's transaction activity. The other users and/or financial institutions, otherwise termed as members of the block chain, may have a complete or partial copy of the entire ledger or set of transaction information records and/or blocks on the block chain. Each transaction information is validated based on logic/rules of a smart contract associated with the financial institution or entered into an agreed-upon by members. The block chain in these circumstances may either be a consortium block chain or a private block chain where access to read and/or write into the block chain may be restricted and accessible only to members involved in the exchange of transaction information, or in some cases, the block chain may be public block chain.

In some embodiments, the system may be configured to receive a request from one or more entities (users, merchants, financial institutions, and/or the like) to access the block to update the block chain with information associated with one or more transfer of resources executed by the first user with the one or more entities. In response, the system may be configured to determine whether the one or more entities is a member. Typically a member has authorized access to the block chain. In this regard, the system may be configured to receive authentication credentials from the one or more entities and validate the authentication credentials to enable authorized access for the entities to access the block chain. The system may then receive information associated with the transfer of resources executed by the first user with the one or more entities and update the block chain with the information received from the one or more entities.

Next, as shown in block 708, the process flow includes transmitting a notification to a computing system associated with the second user to validate the transfer of resources. In some embodiments, the notification includes a link to a web portal associated with the block chain of user information associated with the first user, information associated with the first user, information associated with the second user, and information associated with the transfer of resources from the first user to the second user. In this regard, the web portal is generated on the computing device associated with the first user and specifically requiring application-specific circuitry on the computing device associated with the first user to enable the first user to initiate the notification and present the notification to the second user. When the notification is transmitted to the second user, a link to the web portal is transmitted along with the notification by which the second user may initiate the generation of the web portal on the computing device associated with the second user. In some embodiments, the notification may be provided to the second user as a text message, pop-up notification, an email, or the like. When the user initiates the link in the notification, the system may be configured to generate a web portal according to the configuration of the computing device associated with the second user. For example, if the second user receives the notification on the mobile device, the web portal is generated according to the configuration capabilities of that mobile device. If the second user receives the notification on a desktop computer, the web portal is generated according to the configuration capabilities of the desktop computer. In this regard, the system may also be configured to determine one or more functionalities and/or features accessible within the web portal according to the configuration of the computing device used by the second user when generating the web portal.

In this way, the present invention provides all the necessary information to the second user to enable the second user to validate the transfer of resources executed by the first user. For example, the first user may be tenant and a second user may be a landlord. The tenant, an unbanked user, may resort to cash transaction with the landlord to pay the monthly rent. In this scenario, the landlord is forced to keep individual private ledger for each tenant indicating that they have paid the rent for a particular month. Similarly, each tenant is forced to keep a private ledger indicating that the landlord has received the rent for particular month. In this scenario, the landlord will have to track and maintain each private ledger individually. By providing the landlord with the option of validating the tenant's monthly rent on the block chain, and providing the information to a third party (e.g., miners) for further validation, the monthly rent information from multiple tenants can be maintained and tracked more efficiently on the block chain distributed memory of the landlord.

In some embodiments, the system may determine that the first user has executed the transfer of resources with the second user using a financial institution account associated with the first user. In some other embodiments, the system may determine that the first user has executed the transfer of resources with the second user using an account associated with an e-commerce payment system facilitating the acceptance of electronic payment for online transactions. In one aspect, the system may be configured to determine that the transfer of resources executed by the first user is facilitated by a financial institution associated with a second user. In another aspect, the system may be configured to determine that the transfer of resources executed by the first user is facilitated by an e-commerce payment system associated with the second user. In response, the system may then retrieve information associated with the financial institution account associated with the first user and transmit the information associated with the financial institution account to the computing system associated with a second user for validation of the transfer of resources.

Next, as shown in block 710, the process flow includes receiving via the web portal, an input from the second user validating the transfer of resources (information record). In some embodiments, the validation step may be performed by the computing device associated with the second user prior to adding the information to the block chain based on the logic and rules from the source institution's distributed ledger. The second user posts the validated information record to the block chain with an authentication key or signature that is recognized by other members of the block chain. The validation may also be performed by one or more of the members other than the second user. For example, in a block chain certain entities may be designated as validation institutions that in addition to being potential source and/or host institutions operate as validation entities for all members of the block chain. In such an arrangement, the information record of the second user (i.e. the entity through which the transfer of resources was originally made with the first user) is first sent by the second user to one or more entities for validation and the request is validated using information provided with the request to the one or more entities based on the logic and rules from the block chain's distributed ledger.

The validated information record may then be posted to the block chain by the one or more entities with a signature or authentication key indicating that the transaction is validated. In this regard, the system may be configured to update the block chain of user information associated with the first user with the validated transfer of resources based on at least receiving the input from the second user, as shown in block 712. In other embodiments, the transaction information record is first sent by the second user to the one or more entities for validation, and the request is validated based on information provided with the information record at the one or more entities. The one or more entities validating the information record may transmit the signature or authentication key to the second user, and the second user may post the validated information record to the block chain. In some embodiments the one or more entities validating the information record may comprise any entity that is not a member financial institution and that does not function as a host or source. In such an embodiment the validation institution does not access, maintain or control any user information records and only functions to validate the information record (in this case, the transfer of assets). Once the transaction information record is validated, the one or more validating entities may provide an authentication key or signature to the second user that is used by the second user to post the validated device record to the block chain. In some embodiments, the system may be configured to enable the users to export the block chain of information record to a third party for various other purposes.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

| U.S. patent application Ser. No. | Title | Filed On |
| --- | --- | --- |
| 14/942,326 published as U.S. patent application Pub. No. 2017/0140408 | TRANSPARENT SELF-MANAGING REWARDS PROGRAM USING BLOCKCHAIN AND SMART CONTRACTS | Nov. 16, 2015 |
| 15/041,555 published as U.S. patent application Pub. No. 2017/0132630 | BLOCK CHAIN ALIAS FOR PERSON-TO-PERSON PAYMENTS | Feb. 11, 2016 |
| 62/253,935 | BLOCK CHAIN ALIAS PERSON-TO-PERSON PAYMENT | Nov. 11, 2015 |
| 15/041,566 published as U.S. patent application Pub. No. 2017/0132615 | BLOCK CHAIN ALIAS PERSON-TO-PERSON PAYMENTS | Feb. 11, 2016 |
| 15/050,375 now granted as U.S. Pat. No. 10,135,870 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 15/050,379 published as U.S. patent application Pub. No. 2017/0243215 | SYSTEM FOR EXTERNAL SECURE ACCESS TO PROCESS DATA NETWORK | Concurrently Herewith |
| 15/050,358 now granted as U.S. Pat. No. 10,178,105 | SYSTEM FOR PROVIDING LEVELS OF SECURITY ACCESS TO A PROCESS DATA NETWORK | Concurrently Herewith |
| 62/293,585 | SYSTEM FOR SECURE ROUTING OF DATA TO VARIOUS NETWORKS FROM A PROCESS DATA NETWORK | Feb. 10, 2016 |
| 62/293,620 | SYSTEM FOR CENTRALIZED CONTROL OF SECURE ACCESS TO PROCESS DATA NETWORK | Feb. 10, 2016 |
| 15/049,605 now granted as U.S. Pat. No. 10,129,238 | SYSTEM FOR CONTROL OF SECURE ACCESS AND COMMUNICATION WITH DIFFERENT PROCESS DATA | Concurrently Herewith |

| U.S. patent application Ser. No. | Title | Filed On |
|---|---|---|
| | NETWORKS WITH SEPARATE SECURITY FEATURES | |
| 15/049,716 published as U.S. patent application Pub. No. 2017/0243208 | SYSTEM FOR CONTROL OF DEVICE IDENTITY AND USAGE IN A PROCESS DATA NETWORK | Concurrently Herewith |
| 15/049,777 now granted as U.S. Pat. No. 10,142,312 | SYSTEM FOR ESTABLISHING SECURE ACCESS FOR USERS IN A PROCESS DATA NETWORK | Concurrently Herewith |
| 15/049,835 now granted as U.S. Pat. No. 10,026,118 | SYSTEM FOR ALLOWING EXTERNAL VALIDATION OF DATA IN A PROCESS DATA NETWORK | Concurrently Herewith |
| 15/050,094 now granted as U.S. Pat. No. 10,116,667 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 15/050,098 published as U.S. patent application Pub. No. 2017/0213221 | SYSTEM FOR TRACKING AND VALIDATION OF MULTIPLE INSTANCES OF AN ENTITY IN A PROCESS DATA NETWORK | Concurrently Herewith |
| 62/287,301 | SYSTEM FOR TRACKING AND VALIDATION OF MULTIPLE INSTANCES OF AN ENTITY IN A PROCESS DATA NETWORK | Jan. 26, 2016 |
| 15/050,084 now patented as U.S. Pat. No. 9,825,931 | SYSTEM FOR TRACKING AND VALIDATION OF AN ENTITY IN A PROCESS DATA NETWORK | Concurrently Herewith |
| 62/287,298 | SYSTEM FOR TRACKING AND VALIDATION OF AN ENTITY IN A PROCESS DATA NETWORK | Jan. 26, 2016 |
| 15/050,372 published as U.S. patent application Pub. No. 2017/0243217 | SYSTEM FOR ROUTING OF PROCESS AUTHORIZATIONS AND SETTLEMENT TO A USER IN A PROCESS DATA NETWORK | Concurrently Herewith |
| 15/050,285 now granted as U.S. Pat. No. 10,318,938 | SYSTEM FOR ROUTING OF PROCESS AUTHORIZATION AND SETTLEMENT TO A USER IN PROCESS DATA NETWORK BASED ON SPECIFIED PARAMETERS | Concurrently Herewith |
| 15/050,292 published as U.S. patent application Pub. No. 2017/0243209 | SYSTEM FOR GRANT OF USER ACCESS AND DATA USAGE IN A PROCESS DATA NETWORK | Concurrently Herewith |
| 15/050,294 published as U.S. patent application Pub. No. 2017/0243212 | SYSTEM FOR IMPLEMENTING A DISTRIBUTED LEDGER ACROSS MULTIPLE NETWORK NODES | Concurrently Herewith |
| 15/049,865 published as U.S. patent application Pub. No. 2017/0244720 | SYSTEM FOR EXTERNAL VALIDATION OF PRIVATE-TO-PUBLIC TRANSITION PROTOCOLS | Concurrently Herewith |
| 15/049,852 now granted as U.S. Pat. No. 10,140,470 | SYSTEM FOR EXTERNAL VALIDATION OF DISTRIBUTED RESOURCE STATUS | Concurrently Herewith |
| 15/050,321 published as U.S. patent application Pub. No. | SYSTEM FOR MANAGING SERIALIZABILITY OF RESOURCE TRANSFERS IN A PROCESS DATA NETWORK | Concurrently Herewith |
| 2017/0243287 15/050,307 published as U.S. patent application Pub. No. 2017/0243213 | SYSTEM TO ENABLE CONTACTLESS ACCESS TO A TRANSACTION TERMINAL USING A PROCESS DATA NETWORK | Concurrently Herewith |

What is claimed is:

1. A system operatively connected with a block chain distributed network and for using the block chain distributed network for tracking transfer of resources in a process data network, the system comprising:

a memory device storing logic and rules for the block chain; and a processing device operatively coupled to the memory device, wherein the processing device is configured to execute computer-readable program code to:

electronically receive an indication from a computing system associated with a first user that the first user has executed a transfer of resources with a first financial institution;

retrieve information associated with the first user, information associated with the first financial institution, and information associated with the transfer of resources from the first user;

transmit to a block chain distributed ledger an indication that the first user has executed the transfer of resources with the first financial institution, wherein transmitting further comprises storing on the distributed ledger, the information associated with the first user, the information associated with the first financial institution, and the information associated with the transfer of resources;

transmit a notification to a computing system associated with the first financial institution to validate the transfer of resources, wherein the notification comprises a link to a web portal associated with the block chain distributed ledger, information associated with the first user, information associated with the first financial institution, and information associated with the transfer of resources;

receive, via the web portal, an input from the first financial institution validating the transfer of resources;

update the block chain distributed ledger with the validated transfer of resources based on at least receiving the input from the first financial institution;

receive an indication that the first user wishes to execute a transaction with a second financial institution;

determine that the first user execution of the transaction requires determining a creditworthiness of the first user;

retrieve information associated with the transfer of resources executed by the first user from the block chain distributed ledger indicating one or more transfer of resources executed by the first user with one or more other financial institutions and without the second financial institution, wherein the one or more financial institutions comprises the first financial institution;

determine a credit worthiness of the user based on at least the information retrieved from the block chain distributed ledger;
determine that the creditworthiness of the first user is greater than a predetermined threshold; and
allow the execution of the transaction with the second financial institution based on based on at least determining that the creditworthiness of the first user is greater than the predetermined threshold.

2. The system of claim 1, wherein the processing device is configured to execute computer-readable program code further to:
receive a request from one or more entities to access the block chain distributed ledger to update the block chain distributed ledger with information associated with one or more transfer of resources executed by the first user with the one or more entities;
determine that the one or more entities is a member, wherein a member has authorized access to the block chain distributed ledger;
enable the one or more entities to access the block chain distributed ledger;
receive information associated with the transfer of resources executed by the first user with the one or more entities; and
update the block chain distributed ledger with the information received from the one or more entities.

3. The system of claim 2, wherein the processing device is configured to execute computer-readable program code further to:
receive one or more authentication credentials from the one or more entities to enable the one or more entities to access the block chain distributed ledger;
validate the one or more authentication credentials; and
enable the one or more entities to access the block chain distributed ledger in response to validating the one or more authentication credentials.

4. The system of claim 1, wherein the processing device is configured to execute computer-readable program code further to:
determine that the first user has executed the transfer of resources with the first financial institution using a financial institution account associated with the first user;
retrieve information associated with the financial institution account associated with the first user; and
transmit the information associated with the financial institution account associated with the first user to the computing system associated with the first financial institution for validation of the transfer of resources, wherein the information associated with the financial institution account associated with the first user is transmitted with the notification.

5. The system of claim 1, wherein the processing device is configured to execute computer-readable program code further to:
update the block chain distributed ledger with the transfer of resources executed by the first user with the one or more entities;
transmit a request to the one or more members to validate the transfer of resources based on logic and rules for the block chain distributed ledger; and
post validated transaction activity to the block chain distributed ledger.

6. A computerized method for using the block chain distributed network for tracking transfer of resources in a process data network, the method comprising:

electronically receiving an indication from a computing system associated with a first user that the first user has executed a transfer of resources with a first financial institution;
retrieving information associated with the first user, information associated with the first financial institution, and information associated with the transfer of resources from the first user;
transmitting to a block chain distributed ledger an indication that the first user has executed the transfer of resources with the first financial institution, wherein transmitting further comprises storing on the distributed ledger, the information associated with the first user, the information associated with the first financial institution, and the information associated with the transfer of resources;
transmitting a notification to a computing system associated with the first financial institution to validate the transfer of resources, wherein the notification comprises a link to a web portal associated with the block chain distributed ledger, information associated with the first user, information associated with the first financial institution, and information associated with the transfer of resources;
receiving, via the web portal, an input from the first financial institution validating the transfer of resources;
updating the block chain distributed ledger with the validated transfer of resources based on at least receiving the input from the first financial institution;
receiving an indication that the first user wishes to execute a transaction with a second financial institution;
determining that the first user execution of the transaction requires determining a creditworthiness of the first user;
retrieving information associated with the transfer of resources executed by the first user from the block chain distributed ledger indicating one or more transfer of resources executed by the first user with one or more other financial institutions and without the second financial institution, wherein the one or more financial institutions comprises the first financial institution;
determining a credit worthiness of the user based on at least the information retrieved from the block chain distributed ledger;
determine that the creditworthiness of the first user is greater than a predetermined threshold; and
allow the execution of the transaction with the second financial institution based on based on at least determining that the creditworthiness of the first user is greater than the predetermined threshold.

7. The method of claim 6, wherein the method further comprises:
receiving a request from one or more entities to access the block chain distributed ledger to update the block chain distributed ledger with information associated with one or more transfer of resources executed by the first user with the one or more entities;
determining that the one or more entities is a member, wherein a member has authorized access to the block chain distributed ledger;
enabling the one or more entities to access the block chain distributed ledger;
receiving information associated with the transfer of resources executed by the first user with the one or more entities; and
updating the block chain distributed ledger with the information received from the one or more entities.

8. The method of claim 7, wherein the method further comprises:
receiving one or more authentication credentials from the one or more entities to enable the one or more entities to access the block chain distributed ledger;
validating the one or more authentication credentials; and
enabling the one or more entities to access the block chain distributed ledger in response to validating the one or more authentication credentials.

9. The method of claim 6, wherein the method further comprises:
determining that the first user has executed the transfer of resources with the first financial institution using a financial institution account associated with the first user;
retrieving information associated with the financial institution account associated with the first user; and
transmitting the information associated with the financial institution account associated with the first user to the computing system associated with the first financial institution for validation of the transfer of resources, wherein the information associated with the financial institution account associated with the first user is transmitted with the notification.

10. The method of claim 6, wherein the method further comprises:
updating the block chain distributed ledger with the transfer of resources executed by the first user with the one or more entities;
transmitting a request to the one or more members to validate the transfer of resources based on logic and rules for the block chain distributed ledger; and
posting validated transaction activity to the block chain distributed ledger.

11. A computer program product for execution on a system operatively connected with the block chain distributed network, the computer program product for using the block chain distributed network for tracking transfer of resources in a process data network, the computer program product comprising at least one non-transitory computer-readable medium having computer-readable program code portions embodied therein, the computer-readable program code portions comprising, the system comprising:
an executable portion configured to electronically receive an indication from a computing system associated with a first user that the first user has executed a transfer of resources with a first financial institution;
an executable portion configured to retrieve information associated with the first user, information associated with the first financial institution, and information associated with the transfer of resources from the first user;
an executable portion configured to transmit to a block chain distributed ledger an indication that the first user has executed the transfer of resources with the first financial institution, wherein transmitting further comprises storing on the distributed ledger, the information associated with the first user, the information associated with the first financial institution, and the information associated with the transfer of resources;
an executable portion configured to transmit a notification to a computing system associated with the first financial institution to validate the transfer of resources, wherein the notification comprises a link to a web portal associated with the block chain distributed ledger, information associated with the first user, information associated with the first financial institution, and information associated with the transfer of resources;
an executable portion configured to receive, via the web portal, an input from the first financial institution validating the transfer of resources;
an executable portion configured to update the block chain distributed ledger with the validated transfer of resources based on at least receiving the input from the first financial institution;
an executable portion configured to receive an indication that the first user wishes to execute a transaction with a second financial institution;
an executable portion configured to determine that the first user execution of the transaction requires determining a creditworthiness of the first user;
an executable portion configured to retrieve information associated with the transfer of resources executed by the first user from the block chain distributed ledger indicating one or more transfer of resources executed by the first user with one or more other financial institutions and without the second financial institution, wherein the one or more financial institutions comprises the first financial institution;
an executable portion configured to determine a credit worthiness of the user based on at least the information retrieved from the block chain distributed ledger;
an executable portion configured to determine that the creditworthiness of the first user is greater than a predetermined threshold; and
an executable portion configured to allow the execution of the transaction with the second financial institution based on based on at least determining that the creditworthiness of the first user is greater than the predetermined threshold.

12. The computer program product of claim 11 further comprising an executable portion configured to:
receive a request from one or more entities to access the block chain distributed ledger to update the block chain distributed ledger with information associated with one or more transfer of resources executed by the first user with the one or more entities;
determine that the one or more entities is a member, wherein a member has authorized access to the block chain distributed ledger;
enable the one or more entities to access the block chain distributed ledger;
receive information associated with the transfer of resources executed by the first user with the one or more entities; and
update the block chain distributed ledger with the information received from the one or more entities.

13. The computer program product of claim 12 further comprising an executable portion configured to:
receive one or more authentication credentials from the one or more entities to enable the one or more entities to access the block chain distributed ledger;
validate the one or more authentication credentials; and
enable the one or more entities to access the block chain distributed ledger in response to validating the one or more authentication credentials.

14. The computer program product of claim 11 further comprising an executable portion configured to:
determine that the first user has executed the transfer of resources with the first financial institution using a financial institution account associated with the first user;

retrieve information associated with the financial institution account associated with the first user; and transmit the information associated with the financial institution account associated with the first user to the computing system associated with the first financial institution for validation of the transfer of resources, wherein the information associated with the financial institution account associated with the first user is transmitted with the notification.

\* \* \* \* \*